United States Patent
Hartman et al.

(10) Patent No.: US 10,637,677 B2
(45) Date of Patent: Apr. 28, 2020

(54) BROADCAST TRANSMISSION CONTROL APPARATUSES, SYSTEMS, AND METHODS

(71) Applicant: California Eastern Laboratories, Inc., Santa Clara, CA (US)

(72) Inventors: James Paul Hartman, Canton, GA (US); Damon Mark Stewart, Longmont, CO (US)

(73) Assignee: California Eastern Laboratories, Inc., Santa Clara, CA (US)

(*) Notice: Subject to any disclaimer, the term of this patent is extended or adjusted under 35 U.S.C. 154(b) by 2 days.

(21) Appl. No.: 15/872,904

(22) Filed: Jan. 16, 2018

(65) Prior Publication Data
US 2019/0182064 A1    Jun. 13, 2019

Related U.S. Application Data

(63) Continuation-in-part of application No. 15/835,431, filed on Dec. 7, 2017.

(51) Int. Cl.
| H04L 12/18 | (2006.01) |
| H04L 12/851 | (2013.01) |
| H04L 12/801 | (2013.01) |
| H04L 12/823 | (2013.01) |

(52) U.S. Cl.
CPC .......... *H04L 12/1881* (2013.01); *H04L 47/14* (2013.01); *H04L 47/24* (2013.01); *H04L 47/32* (2013.01)

(58) Field of Classification Search
CPC ......... H04L 47/10; H04L 47/28; H04J 3/0685
See application file for complete search history.

(56) References Cited

U.S. PATENT DOCUMENTS

| | | | | |
|---|---|---|---|---|
| 4,922,438 A * | 5/1990 | Ballweg | ................ | H04J 3/0632 370/465 |
| 5,337,313 A * | 8/1994 | Buchholz | ........... | H04Q 11/0478 370/394 |
| 6,538,995 B1 * | 3/2003 | Cox | ................... | H04Q 11/0478 370/232 |
| 6,629,217 B1 * | 9/2003 | Clohset | ................. | G06F 13/161 711/154 |
| 7,356,032 B1 * | 4/2008 | Sumorok | .......... | H04L 29/12028 370/392 |
| 9,100,330 B1 * | 8/2015 | Noveck | ................. | H04L 47/283 |
| 2003/0133465 A1 * | 7/2003 | Alfano | .................. | H04J 3/0685 370/412 |
| 2004/0190537 A1 * | 9/2004 | Ferguson | ................ | H04L 47/10 370/412 |
| 2007/0047575 A1 * | 3/2007 | Cui | ..................... | H04L 12/4633 370/465 |
| 2009/0280815 A1 * | 11/2009 | Roberts | ................. | H04W 36/02 455/436 |
| 2012/0290800 A1 * | 11/2012 | Krishnan | ............ | G06F 13/1689 711/159 |
| 2014/0071823 A1 * | 3/2014 | Pannell | ................... | H04L 47/22 370/230.1 |

(Continued)

*Primary Examiner* — Melanie Jagannathan
(74) *Attorney, Agent, or Firm* — Richard W. James

(57) ABSTRACT

A system, apparatus, and method for network traffic management. The method includes receiving a message to be broadcast over a network, assigning a predefined delay time to the transmission the message, and transmitting the message over the network after passage of the predefined delay time.

21 Claims, 12 Drawing Sheets

(56) References Cited

U.S. PATENT DOCUMENTS

2014/0122790 A1\* 5/2014 Lasserre ........... G11C 11/40611
                                                        711/106
2014/0140209 A1\* 5/2014 Shihada .............. H04L 43/0864
                                                        370/230
2017/0346762 A1\* 11/2017 Lapidous .................. H04L 1/16
2018/0262284 A1\* 9/2018 Pei .......................... H04W 4/60

\* cited by examiner

1140

| 1142<br>Total Broadcasts | 1144<br>Delay time (ms) |
|---|---|
| 0 | 0 |
| 1 | 0 |
| 2 | 0 |
| 3 | 2000 |
| 4 | 4500 |
| 5 | 7000 |
| 6 | 8800 |
| 7 | 10800 |
| 8 | 14400 |

FIG. 11

BROADCAST TRANSMISSION CONTROL APPARATUSES, SYSTEMS, AND METHODS

CROSS-REFERENCE TO RELATED APPLICATIONS

The present application is a continuation-in-part of U.S. patent application Ser. No. 15/835,431, filed Dec. 7, 2017, which is currently pending, that application being incorporated herein in its entirety.

FIELD OF THE INVENTION

The present invention is concerned with managing network traffic. In particular, embodiments of the invention limit the amount of traffic added to a queue to be transmitted on a network at a time.

BACKGROUND OF THE INVENTION

Computer automated control systems often send control messages across a network to actuate controlled apparatuses in those networks. Moreover, frequently a large number of scheduled event messages are retrieved from a data storage device and transmitted across such a network in a short period of time. For example, if lights are to be energized or de-energized at a scheduled time, scheduled event messages may be read for each lighting fixture or bank of fixtures that are controlled together. In addition, an operational control message may be sent across the network to each lighting fixture or bank of fixtures that are controlled together to actuate the lights scheduled to be energized or de-energized. In a large building where many areas, such as lobbies and common areas, are to be lit at one particular time, many scheduled event messages may be read and many control messages may be sent across the network at a time or during a short period of time.

When a large, mesh-networked system is managed and controlled by, for example, a resource-limited, single flow embedded processing system, inefficiencies can arise that impact overall system performance and user experience.

Inefficiencies in such a system may occur when a large number of messages are being sent over the network. When too many messages are sent across the network, the network may become congested and operate inefficiently, message delivery may be delayed, network queues may overflow, thereby losing messages, messages may otherwise be lost and fail to be delivered by the network as required, and users may experience delays or failures in system operation.

There exists a layer of software in many networking systems that manages the transmission and receipt of messages. For example, a ZigBee or Bluetooth software stack is a layer of software that sends and receives messages, including unicast messages (directed to a single device) and broadcast messages (directed to one or more devices). Since broadcast messages are generally sent to more than one device, it is common in a mesh network for a broadcast packet to be re-broadcasted (or repeated) by multiple nodes to ensure all nodes in the system receive the packet. Having multiple nodes re-broadcast each broadcast packet helps ensure that all devices in the network receive the broadcast packet.

Each broadcast packet has high overhead due to the multiple transmissions that can result as multiple nodes re-broadcast each packet. For example, to avoid re-sending a broadcast packet too many times, each node must typically track which broadcast packets it has re-transmitted, often using a broadcast table to store information relevant to each repeated transmission. A broadcast table retains this information for a certain time. The size of the broadcast table limits how many concurrent broadcast packets a device can send and monitor. If the broadcast table is full on a node such that all entries in the table are storing information for broadcast packets, then that node will not be able to store information for any additional broadcast packets until an entry is made available in the table.

Due to limitations in the size of a broadcast table, it is possible for an application to attempt to transmit more broadcasts than can fit in the table. This can lead to having broadcast packets not be received by all devices, or having the broadcast packets be sent in unpredictable bursts over time. For example, if a node has 15 entries in its broadcast table, and there are 8 broadcast transmissions already taking place such that 8 of the 15 entries are being used, and if a device needs to send 10 additional transmissions, then 7 of the 10 new messages could be sent immediately, while the other 3 might be sent at a later time when there is room in the broadcast table. This delay could take many seconds—possibly on the order of 8 or 10 seconds. Of course it undesirable if 7 of 10 commands are sent immediately, and 3 are sent 8 seconds later or are not transmitted at all.

Thus there is a need for systems, apparatuses, and methods to prevent a significant delay between the receipt of first messages and the receipt of second messages that are to be executed concurrently with the first messages.

There is also a need for systems, apparatuses, and methods that provide a delay in sending messages across a network when many messages have recently been sent across that network.

Embodiments of network traffic management apparatuses, systems and methods minimize any delay between the receipt of first messages and second messages that are to be executed concurrently Embodiments of network traffic management apparatuses, systems, and methods delay sending messages across a network when many messages have recently been sent across that network.

Embodiments of network traffic management apparatuses, systems and methods distribute the transmission of messages to be sent at a particular time to prevent loss of transmitted messages or other problems that can occur when many messages are sent at or near the same time.

SUMMARY OF THE INVENTION

Embodiments of network traffic management apparatuses, systems, and methods are directed to systems, apparatuses, and methods for managing network traffic.

In accordance with one embodiment of network traffic management apparatuses, systems, and methods, an apparatus includes a network communication device for communicating data to remote devices, a real-time clock, and a processor. The processor includes instructions which, when executed by the processor, cause the processor to have a message to be broadcast over the network communication device, assign a predefined delay time to the transmission of the message or a current transmission, and transmit the current transmission over the network after passage of the predefined delay time.

In accordance with another embodiment of network traffic management apparatuses, systems, and methods, a network traffic management system includes a network communication device for communicating data to remote devices, a data storage device for storing a plurality of events to be communicated on the network by the network communication device, a real-time clock, and a processor. The processor is coupled to the network communication device, the data storage device, and the real-time clock. The processor further includes instructions which, when executed by the processor, cause the processor to read at least one broadcast to be transmitted, assign a predefined delay time to the transmission of the broadcast or another current transmission, and transmit the broadcast or the current transmission over the network after passage of the predefined delay time.

In accordance with another embodiment of network traffic management apparatuses, systems, and methods, a network traffic management method includes receiving a message to be broadcast over a network, assigning a predefined delay time to the transmission the message, and transmitting the message over the network after passage of the predefined delay time.

Accordingly, the present invention provides solutions to the shortcomings of prior network traffic management apparatuses, systems, and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of broadcast transmission control apparatuses, systems, and methods.

FIG. 11 illustrates an embodiment of a broadcast table; and

DETAILED DESCRIPTION OF THE INVENTION

Reference will now be made to embodiments of broadcast transmission control apparatuses, systems, and methods, examples of which are illustrated in the accompanying drawings. Details, features, and advantages of those broadcast transmission control apparatuses, systems, and methods will become further apparent in the following detailed description of embodiments thereof. It is to be understood that the figures and descriptions included herein illustrate and describe elements that are of particular relevance to network traffic management apparatuses, systems, and methods, while eliminating, for purposes of clarity, other elements found in typical computerized access systems.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

Figure 1:
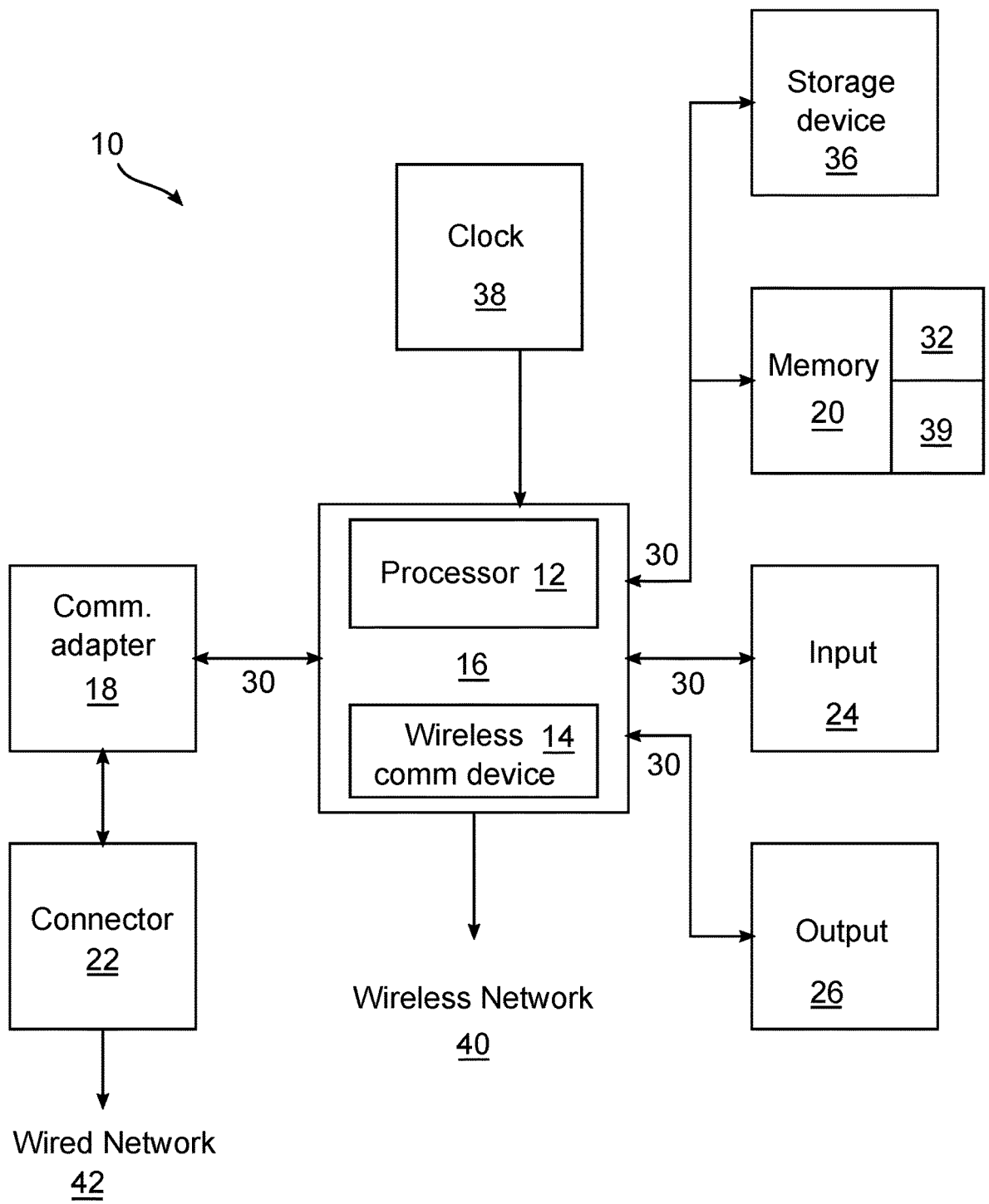
FIG. 1 illustrates an embodiment of a gateway that performs network traffic and processor activity management in one embodiment of the invention.

FIG. 1 illustrates an embodiment of a gateway 10 that performs network traffic management in one embodiment. The gateway 10 includes a processor 12 and a wireless network communication device 14, which may be a Zig-Bee® network communication device. The processor 12 and wireless communication device 14 may be combined in a controller 16, which may be a microcontroller. The gateway 10 also may include a communication adaptor 18, memory 20, a communication adaptor port or connector 22, one or more input devices 24, diagnostic output devices 26, and a clock 38.

The gateway 10 may furthermore facilitate communications across networks including a wireless network 40 and a wired network 42.

It should be recognized that the gateway 10 may have fewer components or more components than shown in FIG. 1. For example, if an input device 24 or output device 26 is not desired, such a device may not be included in the gateway 10.

The elements, including the processor 12, memory 20, data storage device 36, output 26, input 24, and communication adaptor 18 related to the gateway 10 may communicate by way of one or more communication busses 30. Those busses 30 may include, for example, a system bus or a peripheral component interface bus.

The memory 20 may, for example, include random-access memory (RAM), flash RAM, dynamic RAM, or read only memory (ROM) (e.g., programmable ROM, erasable programmable ROM, or electronically erasable programmable ROM) and may store computer program instructions and information. The memory 20 may furthermore be partitioned into sections including an operating system partition 32 where system operating instructions are stored, and a data partition 39 in which data is stored.

The processor 12 may be any desired processor and may be a part of a controller 16, such as a microcontroller, may be part of or incorporated into another device, or may be a separate device. The processor 12 may, for example, be an Intel® manufactured processor or another processor manufactured by, for example, AMD®, DEC®, or Oracle®. The processor 12 may furthermore execute the program instructions and process the data stored in the memory 20. In one embodiment, the instructions are stored in the memory 20 in a compressed or encrypted format. As used herein the phrase, "executed by a processor" is intended to encompass instructions stored in a compressed or encrypted format, as well as instructions that may be compiled or installed by an installer before being executed by the processor 12.

The data storage device 36 may, for example, be nonvolatile battery backed static random-access memory (RAM), a magnetic disk (e.g., hard drive), optical disk (e.g., CD-ROM) or any other device or signal that can store digital information. The data storage device 36 may furthermore have an associated real-time clock 38, which may be associated with the data storage device 36 directly or through the processor 12 or controller 16. The real-time clock 38 may trigger data from the data storage device 36 to be sent to the processor 12, for example, when the processor 12 polls the data storage device 26. Data from the data storage device 36 that is to be sent across the network 40 or 42 through the processor 12 may be sent in the form of messages in packets. Those messages may furthermore be queued in or by the processor 12.

The communication adaptor 18 perm its communication between the gateway 10 and other gateways 11 (depicted in FIG. 2), routers 72 (depicted in FIG. 2), devices, or nodes coupled to the communication adaptor 18 at the communication adaptor connector 22. The communication adaptor 18 may be a network interface that transfers information from a node such as a router 72, a terminal device 74 or 75 (depicted in FIG. 2), a general purpose computer 76 (depicted in FIG. 2), a user interface 77 (depicted in FIG. 2) or another gateway 11 to the gateway 10 or from the gateway 10 to a node 11, 72, 74, or 76. The communication adaptor 18 may be an Ethernet adaptor or another adaptor for another type of network communication. It will be recognized that the gateway 10 may alternately or in addition be coupled directly to one or more other devices through one or more input/output adaptors (not shown).

The input device 24 and output device 26 may couple the gateway 10 to one or m ore input or output devices such as, for example, one or m ore pushbuttons and diagnostic lights or displays. It will be recognized, however, that the gateway 10 does not necessarily need to have an input device 24 or an output device 26 to operate. Moreover, the data storage device 36 may also not be necessary for operation of the gateway 10 as data may be stored in memory, for example. Data may also be stored remotely and accessed over a network, such as the Internet.

The processor 12 may include or be attached to the real-time clock 38 such that the processor 12 may read or retrieve scheduled events from the data storage device 36 when or subsequent to real-time clock 38 indication that the scheduled time has arrived. Those retrieved scheduled events may then be transmitted across the network 40 or 42. One or more of such scheduled events may trigger messages to be sent at a time or in a cycle and, where more than one message is triggered to be sent across the network 40 or 42, those messages may form a queue. The queue may be created at the microprocessor 16.

Figure 2:
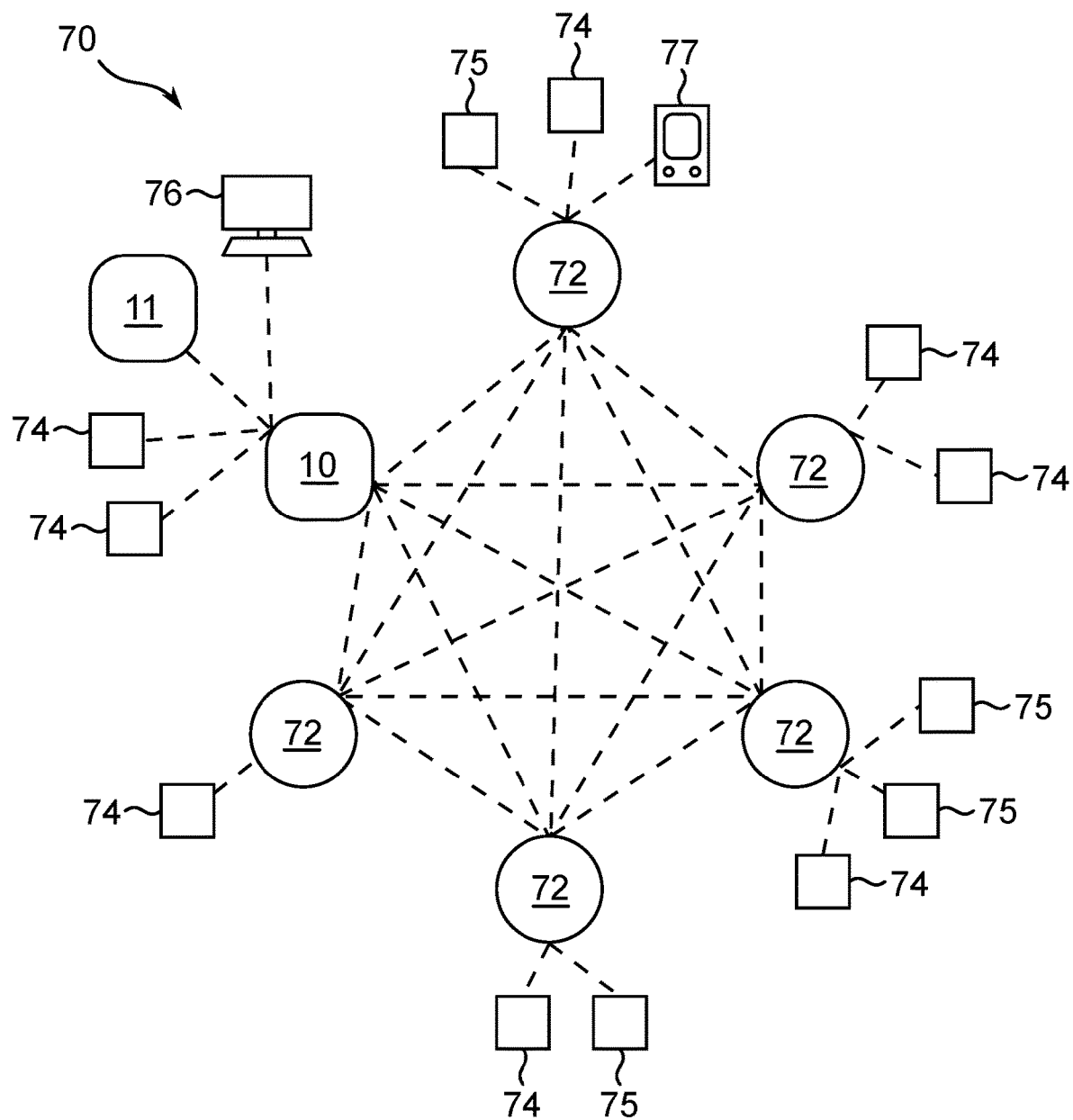
FIG. 2 illustrates an embodiment of a network in an embodiment of network traffic management.

FIG. 2 illustrates a network 70 in an embodiment of network traffic management. The network 70 includes a gateway 10, one or any desired number of additional gateways 11, one or more routers 72, a plurality of end devices 74 and 75, and one or more general purpose computers 76 and user interfaces 77. The additional gateways 11 may be like the gateway 10 illustrated in FIG. 1, or may be of various configurations. The end devices may be actuated devices 74 such as lighting fixtures, blinds, or various other devices that are controlled by or in the network 70 and sensors 75 such as manually operated switches, light level sensors, and other ambient condition sensors.

Messages to be transmitted across the network 40, 42, or 70 may enter a queue. The queue may be a packet queue where packets making up a message are queued for transmission across a network 40, 42, or 70. Messages or packets may be placed in that queue by the processor 12. Those messages and packets to be transmitted across the network may furthermore come from different places or processor 12 functions including scheduled events read from the data storage device 36 by the processor 12 and events or data created by the processor from, for example, sensed data received from a sensor 75 coupled to the network 40, 42, or 70.

The messages transmitted across the network 40, 42, or 70 may include data to be used by one or more of the receiving nodes 72 or 74 or events to be actuated at one or more of the end device receiving nodes 72, 74, or 75 such as turning a light on or off or energizing a motor on a motorized window shade or blind.

In an embodiment of queue operation, only as many as a predetermined number of messages are permitted to be transmitted across the network in a predetermined message transmission time period. The predetermined message transmission time period may, for example, be a single program cycle or another desired period of time. In an embodiment where additional messages that are in addition to the messages currently being transmitted reside in the queue, a predetermined delay time may be permitted to pass before those additional messages are sent across the network. The delay time may, for example, be a per message delay time that is multiplied by the predetermined number of messages or a number of messages that were sent during the last message transmission time period. For example, if 200 messages are transmitted across the network in one program cycle, and the predetermined delay time is 500 ms per message, then the delay time may be 200 messages * 500 ms per message=100 s before the additional messages are transmitted.

Figure 3:
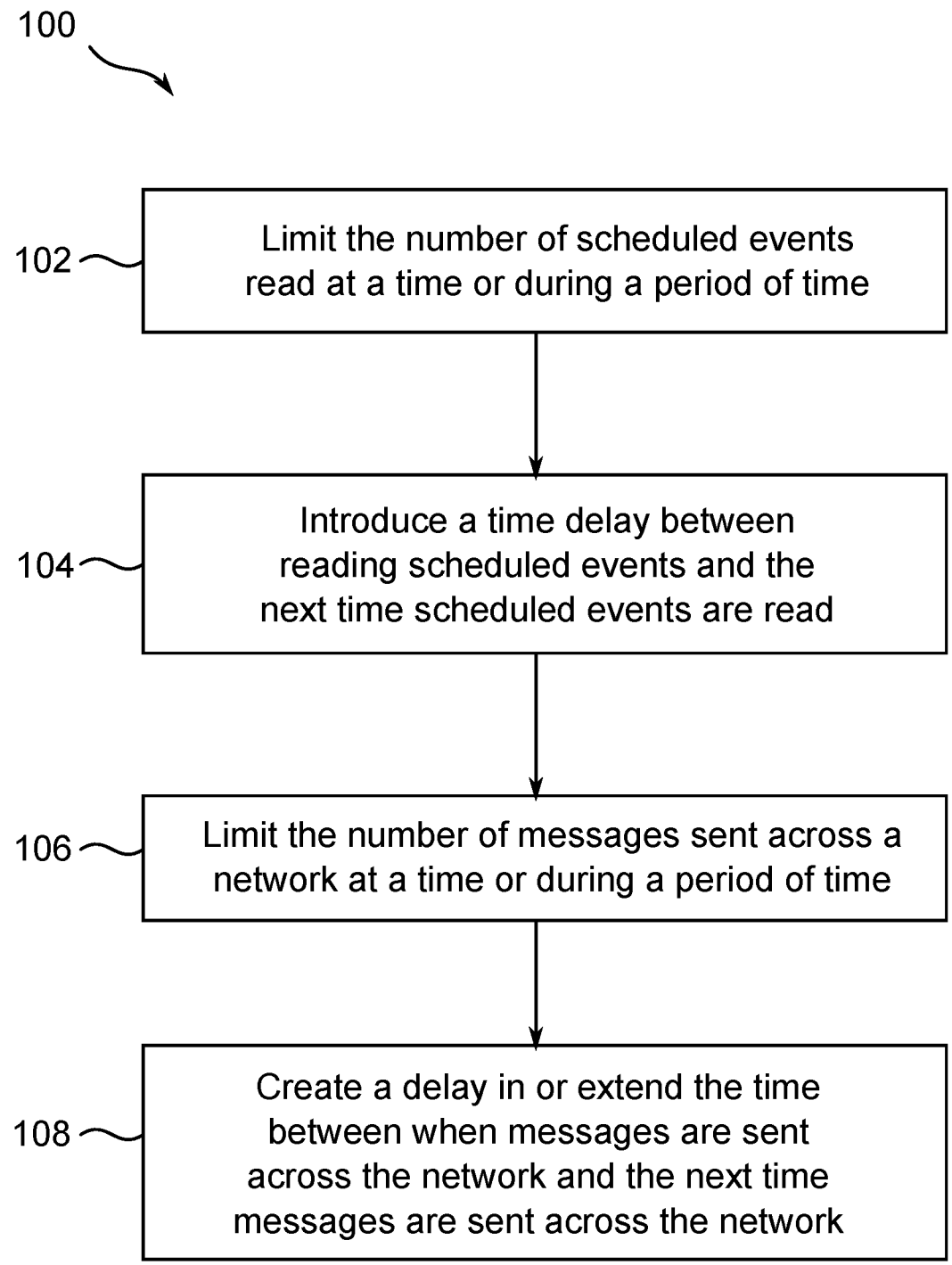
FIG. 3 illustrates an embodiment of a method of processor activity management.

FIG. 3 illustrates a method of processor activity management 100 that may be executed on the network traffic and processor activity management system illustrated in FIG. 1 and described in connection with FIG. 1. That method 100 may include operating strategies including limiting the number of scheduled events the processor 12 reads from the data storage device 36 at a time or during a predetermined period of time such as and iteration of the method or a program cycle, at 102. The method 100 may introduce a time delay between reading scheduled events and the next time scheduled events are read at 104.

The method 100 may limit the number of messages sent across a network 40, 42, or 70 at a time or during a predetermined period of time at 106 and create a delay in or extend the time between when messages are sent across the network 40, 42, or 70 and the next time messages are sent across the network 40, 42, or 70 at 108. The delay of 108 may, for example, be implemented by creating a delay in reading events that cause messages to be sent across the network 40, 42, or 70.

In performing its delay, a system for processor activity management may prevent more than the predetermined number of messages from being retrieved from the data processing device for a period of time which may be one or more iterations. An iteration may furthermore be a program cycle or other natural cycle of the system.

Figure 4:
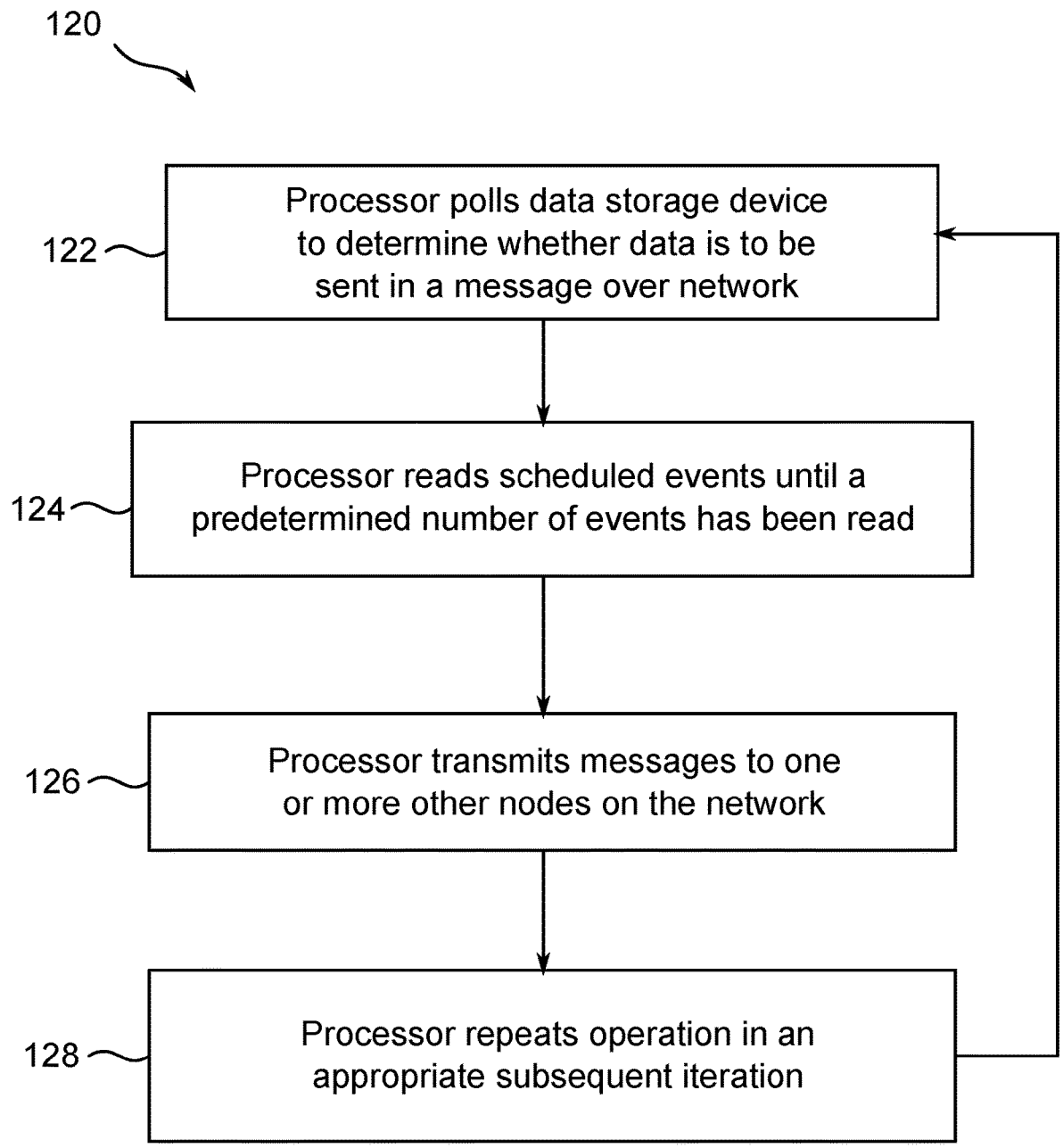
FIG. 4 illustrates an embodiment of a method of limiting the number of scheduled events a processor reads from a data storage device.

FIG. 4 illustrates a method of limiting the number of scheduled events the processor 12 reads from the data storage device 36 at a time or during a predetermined period of time 120. That method 120 may be used at 102 of the method of network traffic management 100. At 122, the processor 12 polls the data storage device 36 to determine whether data in the data storage device 36 is to be sent in a message over one or more of the networks 40, 42, or 70. At 124, the processor 12 reads scheduled events from the data storage device 36 until the processor 12 has read a number of scheduled events equal to a predetermined number of scheduled events permitted to be read by that processor 12. At 126, the processor 12 transmits scheduled events to one or more other nodes 11, 72, 74 or 75 over the network 40, 42, or 70. At 128, the processor 12 repeats the operation at 122-126 in an appropriate subsequent iteration.

In that subsequent iteration, the processor 12 may or may not have additional events to be read from the data storage device 36 or messages to be sent on the network 40, 42, or 70. When the processor 12 has previously reached its limit of scheduled events and, in certain embodiments, passed its message transmission delay period, the processor 12 may return to the data storage device 36 and retrieve additional scheduled events. In such a subsequent pass, the processor 12 may search for events that were to occur at a previously scheduled time between the time that the processor 12 last retrieved events and the current time. The processor 12 may then again retrieve up to the limit of scheduled events for processing and sending across the network 40, 42, or 70 at 122. The processor 12 may continue this process until all events scheduled up to the current time have been retrieved and sent across the network 40, 42, or 70.

Using that method 120, the network traffic and processor activity management system 100 may limit the number of scheduled events that the processor 12 reads from the data storage device 36 in a time period, such as a program cycle. The processor 12 may, for example, have a limit of 50 scheduled events per program cycle.

Figure 5:
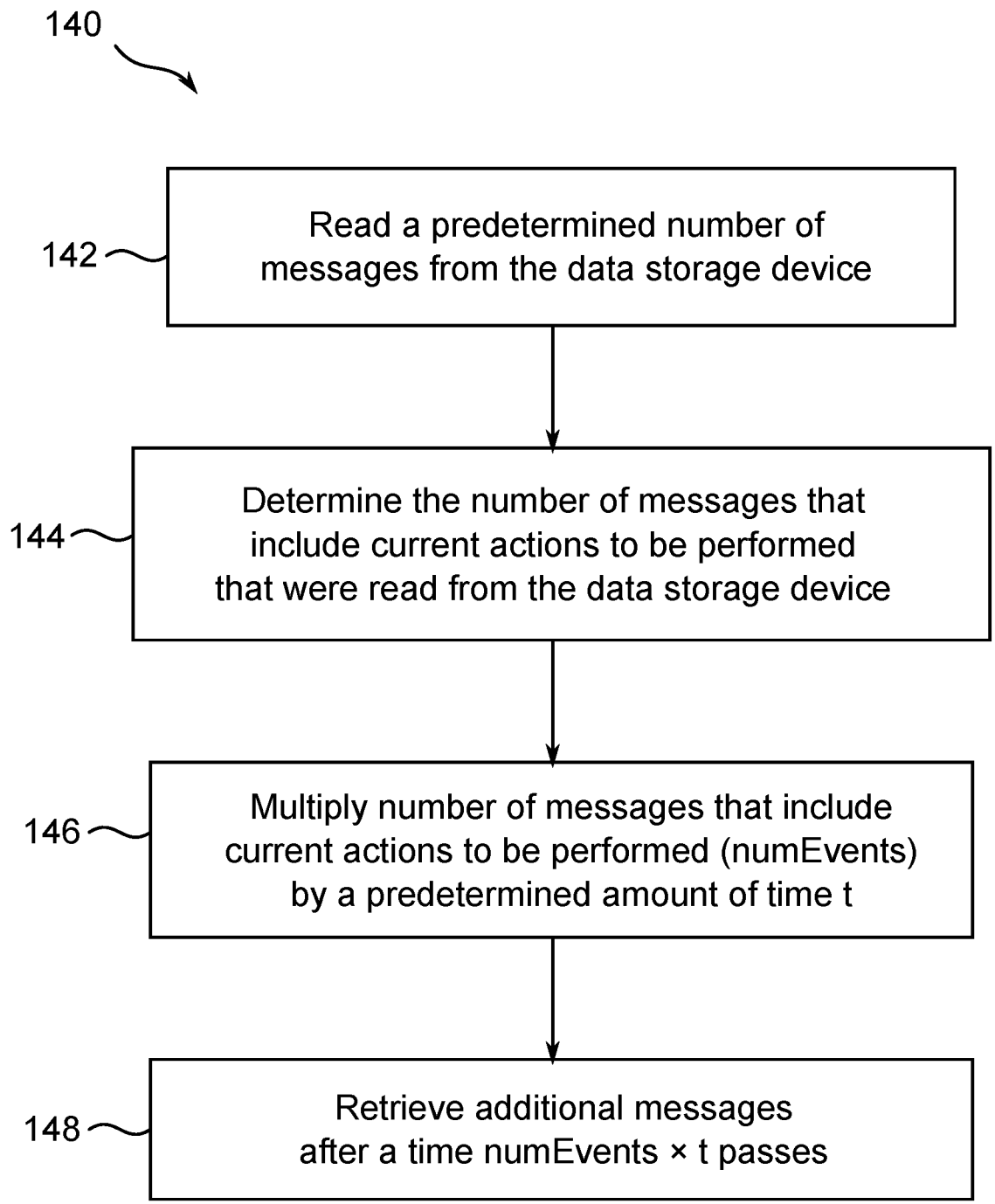
FIG. 5 illustrates an embodiment of a method of delaying processor access to scheduled events in a data storage device.

FIG. 5 illustrates a method 140 of delaying processor 12 access of scheduled events in the data storage device 36. The method 140 may be used at 104 of the method of network traffic management 100. Such a method 140 may be advantageous to prevent excessive processor 12 time from being occupied by accessing the data storage device 36. The method of delaying processor 12 access of scheduled events may alternately or in addition be advantageous to prevent transmission of an excessive number of messages across one or more networks 40, 42, or 70 since each scheduled event may need to be transmitted across one or more of those networks 30, 42, or 70. The method 140 may furthermore be used alone or in addition to the method of limiting the number of scheduled events the processor 12 reads 120 or any other method described herein.

The method of delaying processor access to scheduled events 140 may include reading a predetermined number of messages from the data storage device 36 at 142. At 144, the method 140 may determine the number of messages that include current actions to be performed that were read from the data storage device 36 at 142. It should be recognized that the number of messages that include current actions to be performed may be fewer than all messages read from the data storage device 36. That number of messages that include current actions to be performed that were read may be multiplied by a predetermined delay time at 146. The amount of time to be multiplied by the number of messages read that include current actions to be performed to determine the amount of time the processor 12 should wait before reading additional messages from the data processing device 36 may be, for example, 500 ms. At 148, the processor 12 may access the data processing device 36 to retrieve additional messages after the amount of time determined at 146 passes to provide time for the processor 12 to perform other functions or for previously sent messages to be transmitted across the network 40, 42, or 70.

Such a delay in accessing the data processing device 36 148 may be beneficial because reading messages from a data storage device 36 requires some processor 12 operating time and it may be desirable to free-up the processor 12 to perform other functions. Such a delay 146 may also or alternately be advantageous because it may be that most or all scheduled events read will have to be transmitted across one or more networks 40, 42, and 70 and each message transmitted across a network 40, 42, or 70 requires time and device resources to be executed and it may be desirable to free-up those devices so that those devices can perform other functions or transmit messages from other processors 12.

Once the processor 12 has read scheduled events from the data storage device 36 and, possibly, created additional messages, those messages may be transmitted across one or more networks 40, 42, or 70. Alternately, those messages may be placed in a queue, which may be part of the network system, processor 12 created, or otherwise created for storage of messages or packets that form messages and transmission of those messages or packets across the network 40, 42, or 70 as appropriate.

Figure 6:
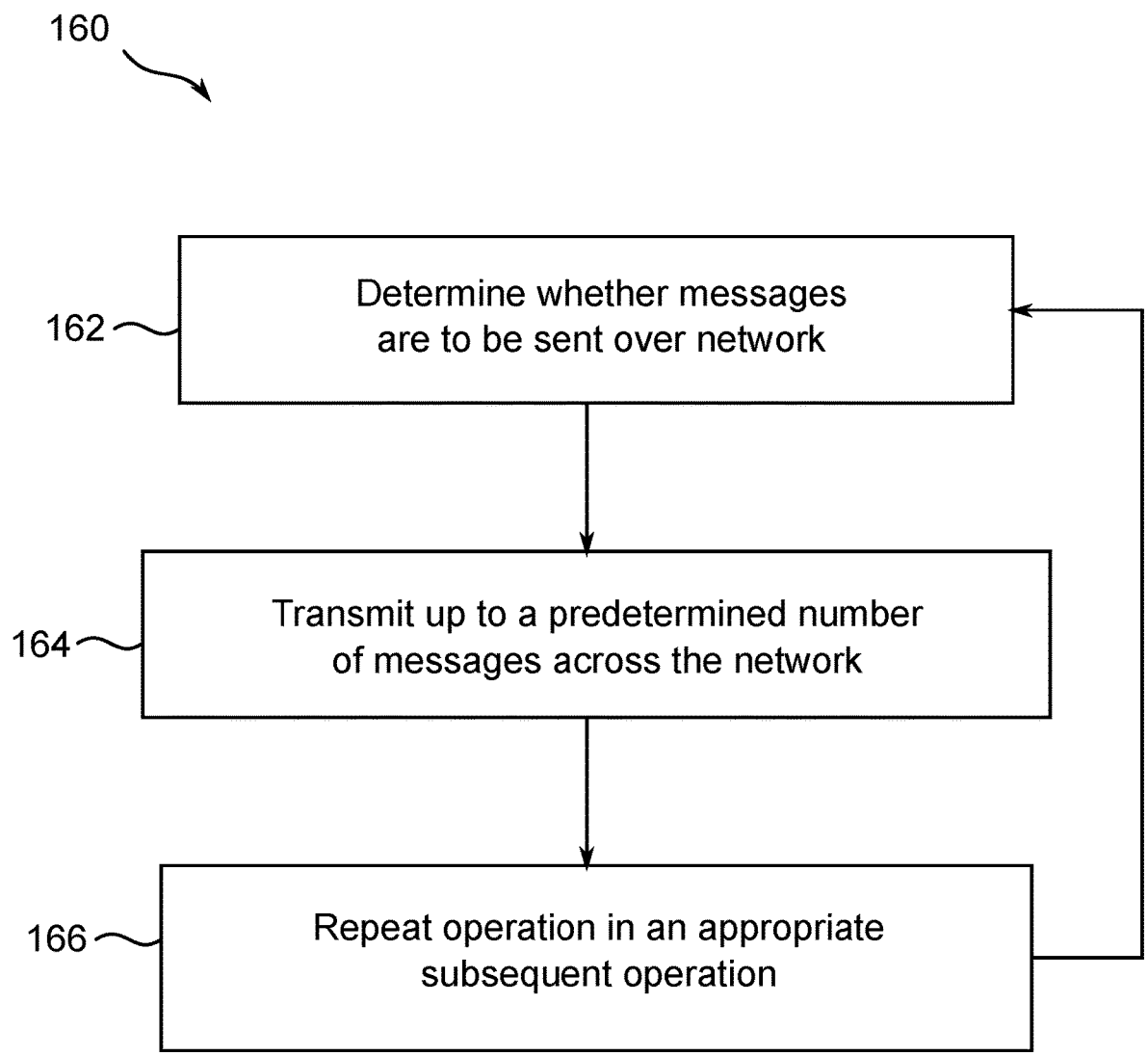
FIG. 6 illustrates an embodiment of a method of limiting a number of messages transmitted across a network.

FIG. 6 illustrates a method of limiting the number of messages transmitted across a network at a time or during a predetermined period of time 160. That method 160 may be used at 106 of the method of network traffic management 100. At 162, the processor 12 determines whether messages are to be transmitted across one or more networks 40, 42, or 70. Those messages may include only scheduled event messages or scheduled event messages and other messages. In determining whether there are messages to be transmitted, the processor 12 may examine one or more network message queues, such as a ZigBee packet queue, in which messages may be waiting to be sent over one or more networks 40, 42, or 70. At 164, the processor 12 will send up to a predetermined number of messages or packets across the one or more networks 40, 42, or 70. Where, for example, there is more than one queue, such as a scheduled message queue and a ZigBee packet queue or another queue, the processor 12 may transmit up to a predetermined number of scheduled event messages and may transmit up to another predetermined number of packets from the packet queue. Alternately, the processor 12 may transmit up to the predetermined number of scheduled messages and all other messages at 164. At 166, the processor 12 will return to 162 to repeat the method 160 in an appropriate subsequent iteration. In that way, the network traffic management system 100 may limit the number of messages that are transmitted in a time period, such as an iteration or a program cycle.

The processor 12 may, for example, have a limit of 50 message transmissions per cycle or iteration.

Messages to be sent may include scheduled events such as actuation of end devices. Actuation of end devices may include energization of lighting fixtures, lowering of blinds, energizing of mechanical and electrical equipment and alarms, and the opening and closing or modulation of valves and dampers.

Processor 12 determined messages may be an example of other messages sent at 164. Such processor 12 determined events may include, for example, blinds being raised or lowered based on sensed information like sunlight level, possibly combined with, schedule data. Any processor resident or created messages to be sent on the network may or may not be included with data storage device 36 messages.

In a subsequent iteration, such as a later program cycle, the processor 12 may or may not have additional messages to be sent on the network 40, 42, or 70. When the processor 12 has previously reached its predetermined message transmission limit and there are additional messages to be transmitted across one or more networks 40, 42, or 70, the processor 12 may transmit up to its predetermined message transmission limit of additional messages across the network 40, 42, or 70 in the subsequent iteration. Thus, in one or more subsequent iterations, the processor 12 may transmit additional messages, continuing this process until all scheduled event messages and other messages to be sent up to the current time have been transmitted across the network 40, 42, or 70.

Figure 7:
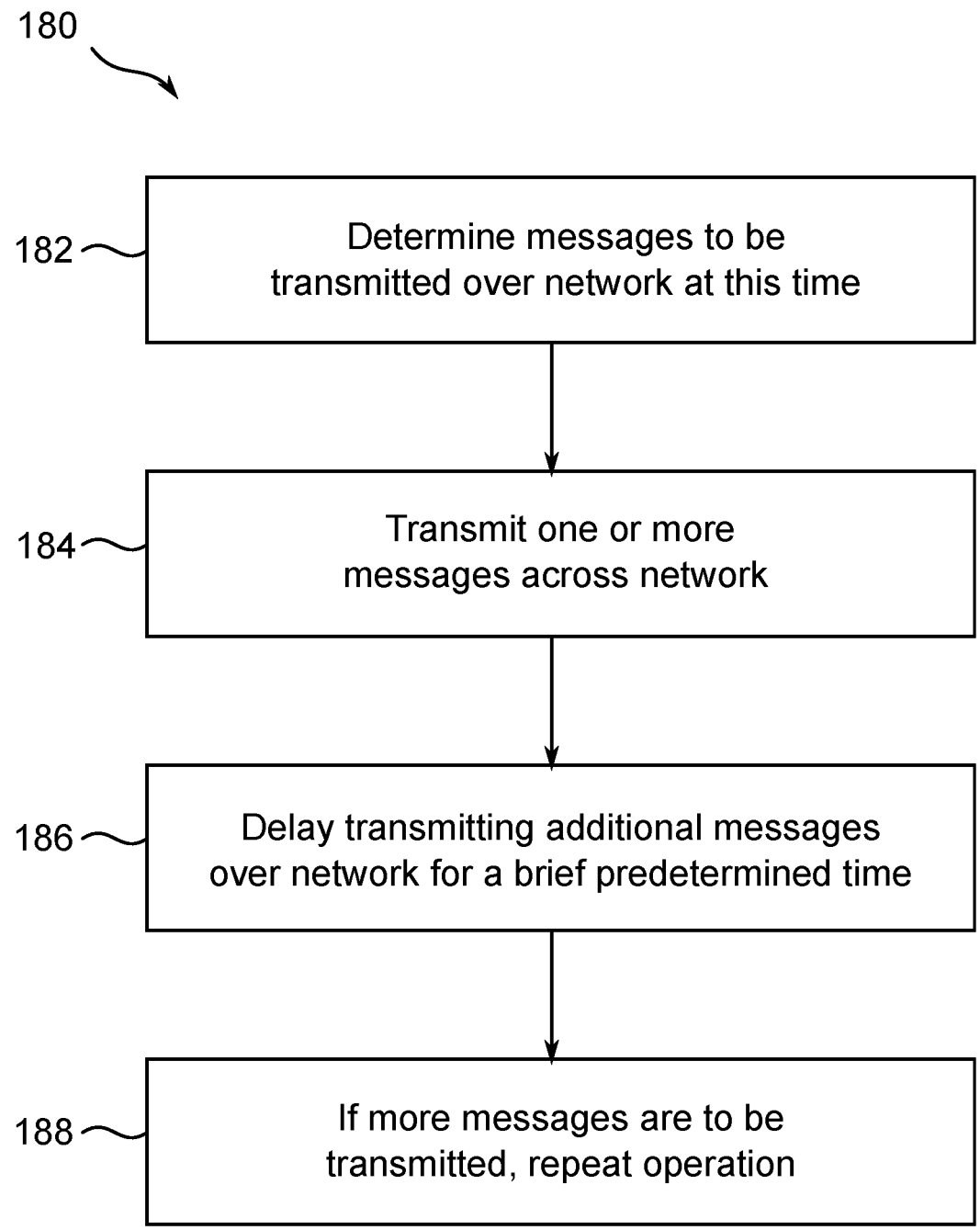
FIG. 7 illustrates an embodiment of a method for delaying processor transmission of messages across a network.

FIG. 7 illustrates a method 180 of delaying processor 12 transmission of messages across one or more of the networks 40, 42, or 70. Such a method may be advantageous to prevent the processor 12 or the network 40, 42, or 70 from being inundated or overly preoccupied with message transmissions. That method may include determining what messages are to be transmitted over the network at this time at 182. It may be recognized that each of those messages may be sent across the network 40, 42, or 70 serially, that each transmission requires some small amount of time, and that transmission of many messages at one time may cause transmission issues described herein. Thus, one or more messages is transmitted across the network 40, 42, or 70 at 184. A short predetermined delay time may then be provided at 186 such that transmission of one or more messages may be followed by a brief delay, such as, for example, a one second delay, to prevent transmission issues caused by too much transmission traffic at one time or over a short period of time. At 188, if more messages are queued to be transmitted, the method 180 may return to 184 to transmit one or more additional messages across the network 40, 42, or 70.

Figure 8:
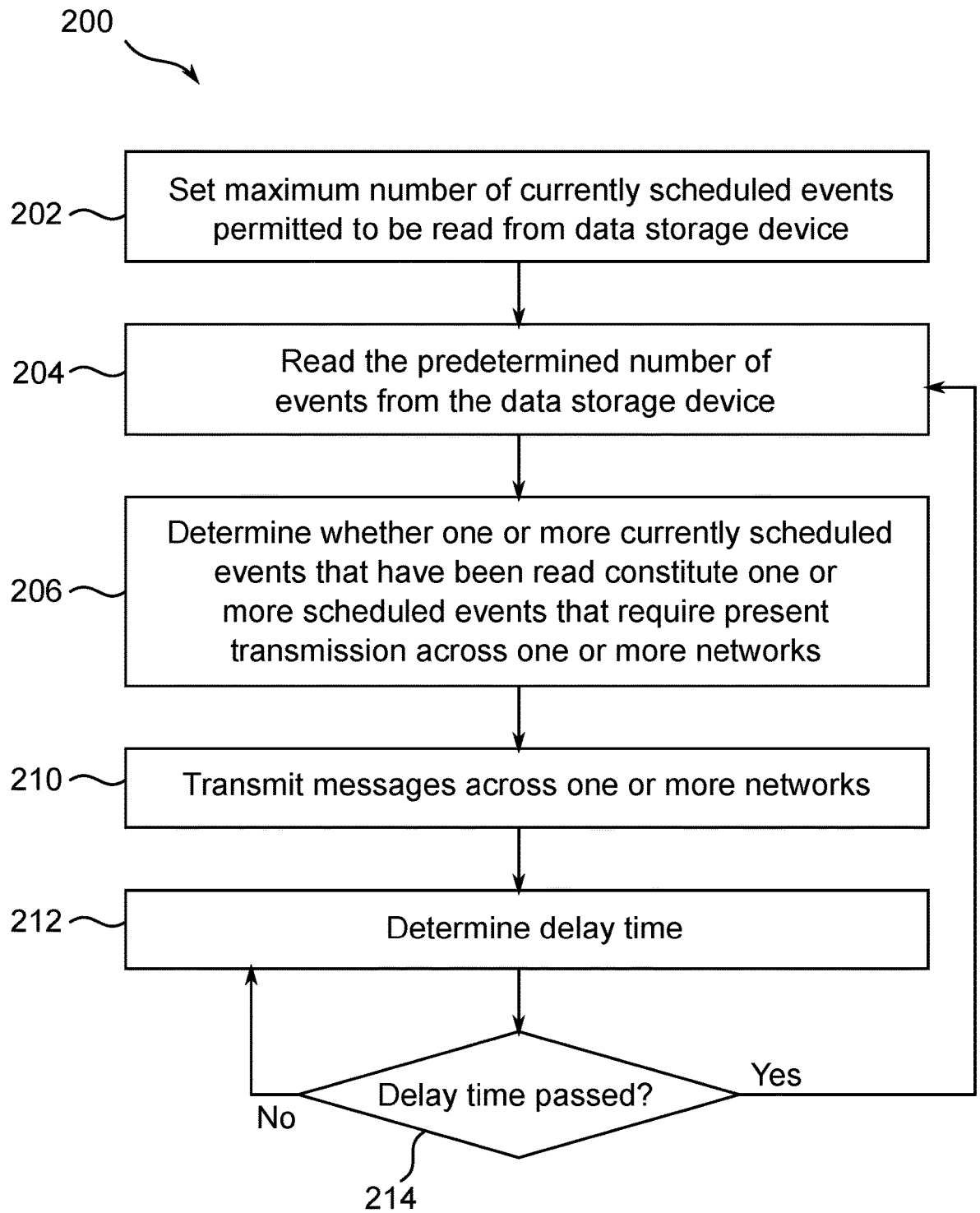
FIG. 8 illustrates another embodiment of managing network traffic.

FIG. 8 illustrates a method of managing network traffic 200. The method has a predetermined maximum number of events that the processor 12 is permitted to read from the data storage device 36 at 202.

In one embodiment, that maximum number of events of 202 is a fixed number of events, such as 20 events. Thus, it should be recognized that certain of the read events may require current action, such as transmission of a message over one or more networks 40, 42, or 70, while other of the read events may not require current action but may, for example, contain actions to be taken at another time.

At 204, the processor 12 accesses the data storage device 36 and reads the predetermined number of events from the data storage device 36. The processor 12 may furthermore prevent more than the predetermined number of events from being read at 204 in an iteration, such as a program cycle. At 206, the processor 12 accesses the time from the real-time clock 38 and determines whether one or more of the events read from the data storage device 36 constitute one or more scheduled events that require present transmission across one of the networks 40, 42, or 70 to one or more nodes 11, 72, 74, 76, or 77 in the network 40, 42, or 70. At 210, the processor 12 transmits the messages containing events read from the data storage device 36 and any processor 12 created messages across one or more networks 40, 42, or 70. At 212, the processor 12 determines a time delay before the processor will read additional messages from the data storage device 36. The time delay may be based on the number of events read by the processor 12 that require current actions to be performed. At 214, after the delay time has passed since the last read of currently scheduled events, the processor 12 returns to 204 and reads additional events from the data storage device 36. Those additional read events could be current or could be left over from a previous cycle. If the delay time from 212 has not passed, the processor 12 performs its programmed instructions without reading additional currently scheduled events from the data storage device 36 or transmitting additional currently scheduled messages across the network 40, 42, or 70.

Another embodiment of network traffic management apparatuses, systems, and methods spreads out multiple broadcast transmissions to avoid the "burst" behavior that may occur due to the nature of broadcast systems, such as for example, ZigBee with its stack broadcast table. Those embodiments may be viewed as broadcast transmission control apparatuses, systems and methods and may have two components—a packet queue to buffer broadcast packets, where the broadcast packets can be delayed and sent to the stack for transmission at predetermined times, and a scheduling component that determines when to send the broadcast packets to the stack for transmission. The packet queue and the scheduling component may be performed by the gateway 10 illustrated in FIG. 1 and may be performed by the processor 12 illustrated in FIG. 1.

A packet queue is a software object that my hold outbound packets until the scheduling module determines it is appropriate to send the transmission. When the scheduling module determines the outbound packets should be transmitted it may, for example, send those outbound packets to a ZigBee stack for transmission. In such an embodiment, any code in an application that needs to send a packet to the ZigBee stack will instead send the packet to the packet queue.

Upon receipt of a new packet, the processor 12 may determine whether the packet is a unicast packet to be sent to a single recipient node 11, 72, 74, 75, or 76 or a broadcast packet to be sent to more than one recipient node 11, 72, 74, 75, or 76. If the packet is a unicast packet, it may be transmitted across the network 40, 42, or 70 immediately, while, if the packet is a broadcast packet, then the packet may remain in the packet queue until the scheduling module determines the packet can be sent to the ZigBee stack.

The scheduling module is responsible for determining when a broadcast item, such as a packet, should be sent, for example to the ZigBee network transmission stack for transmission over the network 40, 42, or 70. In an embodiment, the scheduling module only sends a predetermined number of packets to the stack in a predetermined period of time. That number of packets the scheduling module sends and that predetermined period of time may be variable dependent, for example, on a determination of the network level of activity or prospective level of activity. The scheduling module may thus be responsible for distributing broadcast packets evenly over time to help avoid bursts of broadcast transmissions with large delays between them.

Figure 9:
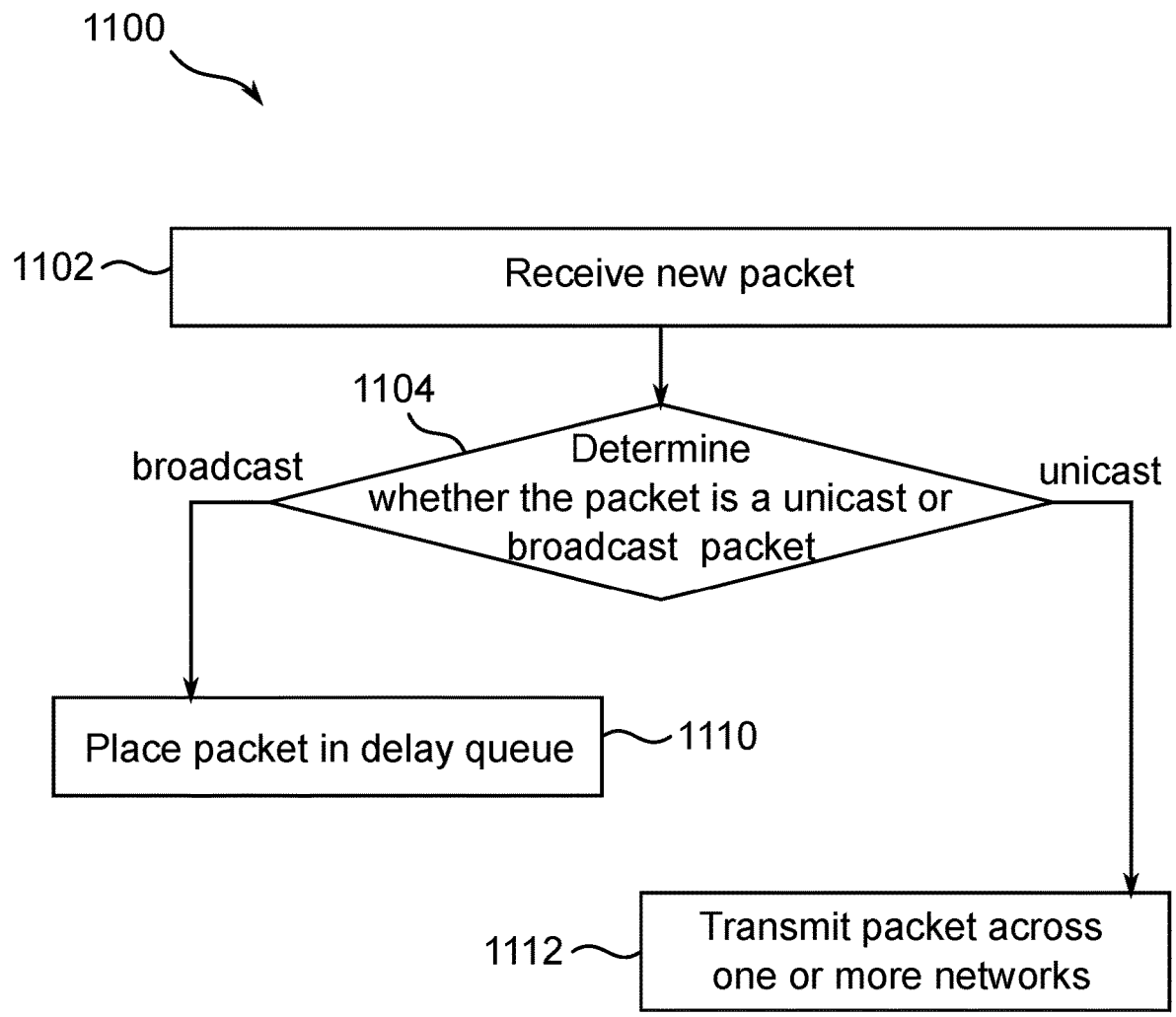
FIG. 9 illustrates an embodiment of a method of delaying transmission of network broadcasts.

FIG. 9 illustrates a method of delaying transmission of network broadcasts 1100 that may be performed by the gateway 10 illustrated in FIG. 1. That method 1100 may make a determination as to whether a new message to be transmitted across a network is to be broadcast to more than one network node (e.g., 11, 72, or 74) or is to be unicast to a single node 11, 72, or 74. In certain embodiments, that determination may be made by the processor 12 illustrated in FIG. 1.

In a wireless network that controls actuation of end devices, which may, for example, be physical devices certain physical devices that are to be actuated concurrently may actually be actuated over a period of time with some physical devices being actuated several seconds after other physical devices to be actuated concurrently. In an example wherein the network used to transmit actuation messages is a ZigBee network, an event may occur that is to actuate multiple groups of lights, shades, or other devices to move to a particular position or be set to a particular state. The event that triggers transmission of the actuation messages could be a time-based event, a sensor state change, or any other event that would trigger a state change in one or more devices.

The event may occur when using the gateway 10 illustrated in FIG. 1 when the gateway 10 is configured to transmit a broadcast command to each of a plurality of devices or groups of devices. The requirement of a period of time that could be several seconds to actuate a plurality of end devices from the time the first end device is actuated until the last end device is actuated, when the control signals to actuate all the plurality of control devices were to be sent concurrently, may be due to the nature of the ZigBee specification and the ZigBee software stack and may occur in other networks for the same or different reasons.

An example of such an occurrence is a command to turn on the lights in a large open office space where ten sets or banks of lights are separately actuated. Prior to the present invention, seven of those ten sets of lights may turn on in less than a second while the other three of those sets of lights may turn on eight seconds after the first seven sets of lights.

At 1102, a new packet to be transmitted on a network (e.g., 40, 42, or 70) is received or created. The packet may be received by, for example, the processor 12 illustrated in FIG. 1 or created from a message received by the processor 12. In certain embodiments, the packet may be created from a scheduled command the processor 12 reads from a data storage device 36. Alternately, the packet may be part of a message created by the processor 12, for example in whole or in part from sensed information. At 1104, a determination may be made as to whether the packet is a unicast packet or a broadcast packet. That determination may be made by the processor 12 illustrated in FIG. 1.

When a new broadcast packet is added to a network transmission queue, such as the packet queue, the scheduling module may check the network transmission stack to determine how many broadcast transmissions are being tracked in the broadcast table. The scheduling module may also determine how many broadcast packets are currently queued in the packet queue. This information can be used to set a delay for transmission of the new packet at 1110. If the packet is to be broadcast, the packet may be placed in queue at 1110 where its transmission may be delayed. If the packet is to be unicast to a single node in the network, the packet may be transmitted across one or more networks 40, 42, 70 at 1112. Thus, in an embodiment, the scheduling algorithm may assign a delay to each new broadcast packet based on the number of broadcasts that the stack is currently managing, the number of broadcast packets already in the queue, or both the number of broadcasts that the stack is currently managing and the number of broadcast packets already in the queue.

Figure 10:
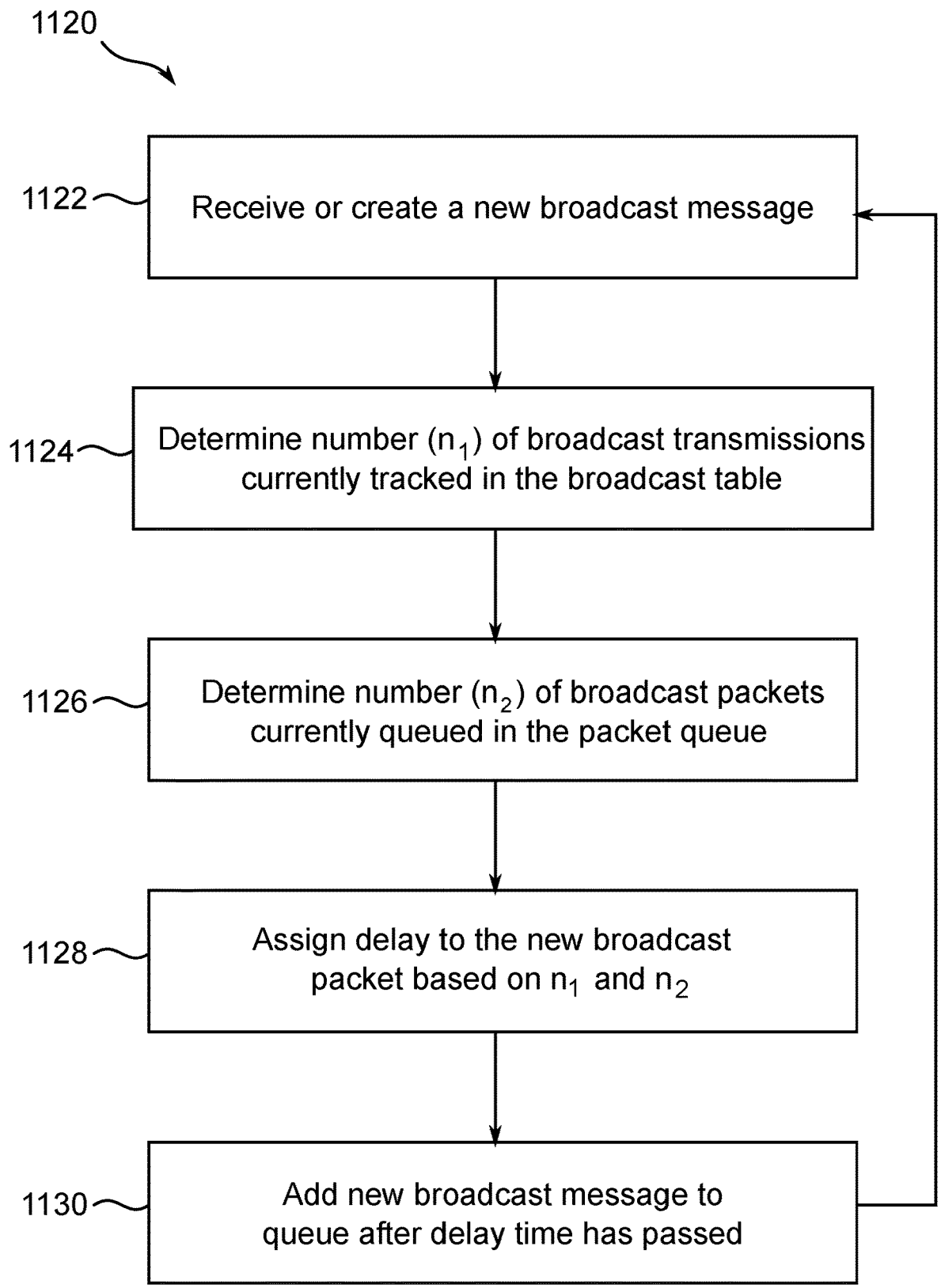
FIG. 10 illustrates an embodiment of a method of assigning a delay time before transmitting a network broadcast.

FIG. 10 illustrates a method of assigning a delay time before transmitting a network broadcast 1120 that may be performed by the gateway 10 illustrated in FIG. 1. That method 1120 receives or creates a new broadcast message at 1122. That message may comprise one or more packets and may have been received from an action taken at 1110 in FIG. 9.

At 1124, the method 1120 may determine a number of broadcast transmissions that are currently tracked in a broadcast table, such as the broadcast table 1140 illustrate and discussed in connection with FIG. 12. At 1126, the method 1120 may determine a number of broadcast packets that are currently queued in the packet queue. The broadcast table may be referred to as a stack and transmissions that are tracked in the broadcast table may be referred to as stack-managed broadcasts. Furthermore, the sum of the number of stack-managed broadcasts and broadcasts that are already in the queue may be referred to as total broadcasts 1142 in FIG. 11. Thus, the scheduling module may assign a delay based on the number of broadcast packets that are in or being managed by the broadcast table stack, the number of packets that are already queued, or on total broadcasts, which includes the number of broadcasts in the broadcast table plus the number of packets that are already queued.

At 1128, a delay may be assigned to the new broadcast based on the number of broadcast transmissions that are currently tracked in a broadcast table determined at 1124, the number of broadcast packets that are currently queued in the packet queue, as determined at 1126, or both. At 1130, the new broadcast message or packets that comprise the message may be added to the queue after delay time has passed.

FIG. 11 illustrates an embodiment of a broadcast table 1140. It should be noted that no delay may be necessary before transmitting a message or packet when the network is not busy and that busy network delays do not necessarily have to be a function of the number of packets or messages currently being transmitted or queued for transmission. The broadcast table 1140 includes a pending broadcast column 1142 and a delay time column 1144. The number of pending broadcasts, which is illustrated in the pending broadcast column 1142 in FIG. 11, is correlated to a predefined amount of time, which is illustrate in the delay time column 1144 in FIG. 11. The predefined amount of time being the time the current broadcast will be delayed before it is sent.

Figure 12:
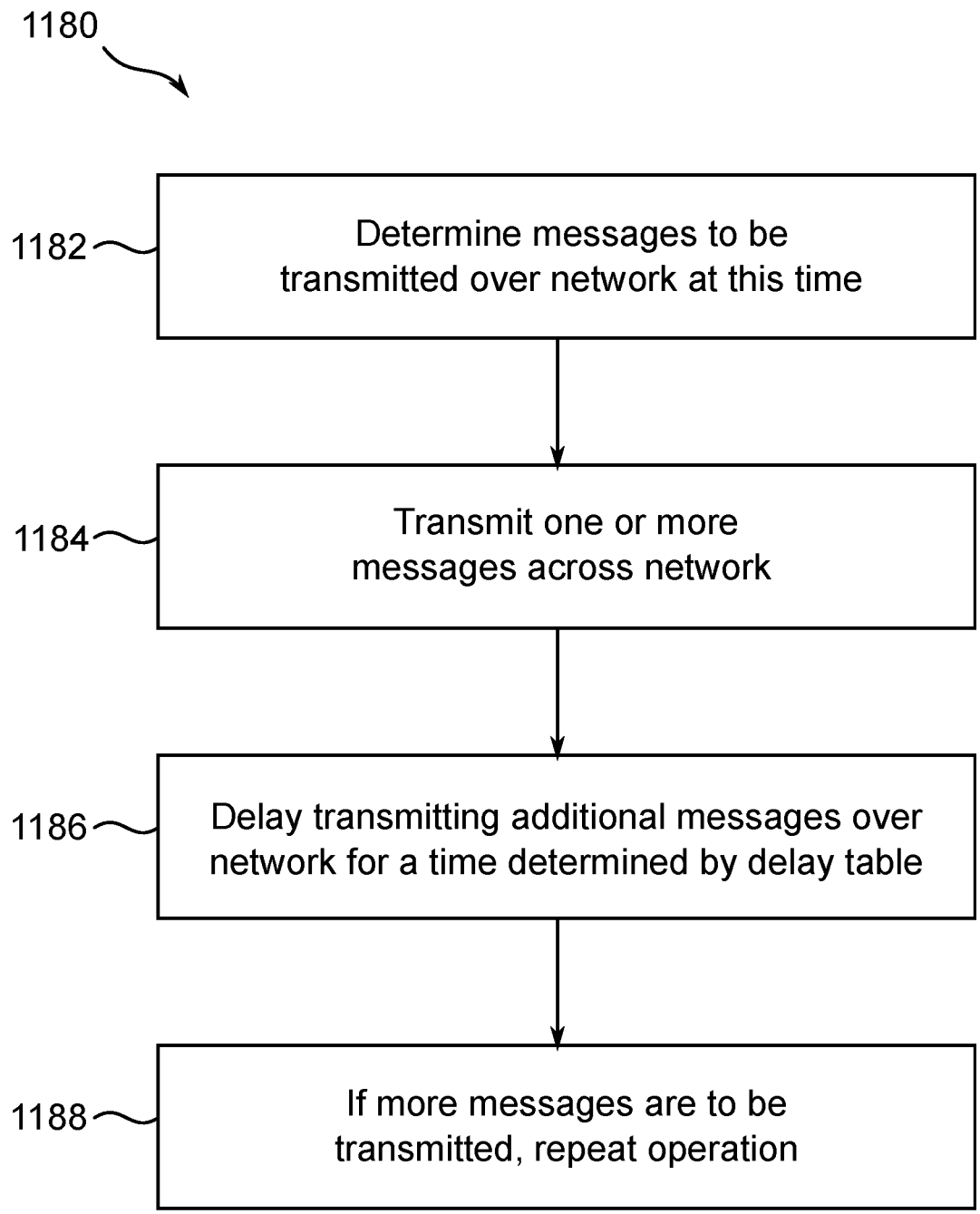
FIG. 12 illustrates an embodiment of a method of broadcast transmission control that determines what packets or messages should be transmitted over a network currently.

FIG. 12 illustrates a method of broadcast transmission control 1180 that may be performed by the gateway 10 illustrated in FIG. 1. That method 1180 may determine what messages or packets are to be transmitted over a network 40, 42, or 70 at the current time, at 1182. That method 1180 may transmit one or more messages or packets across one or more networks 40, 42, or 70 at 1184. Those one or more messages or packets may, for example, by unicast, which require less network bandwidth than broadcast messages and may include broadcast messages or packets when network transmission is not busy, for example when a broadcast has been added to the queue after the delay in method 1120. At 1186, that method 1180 may not transmit messages or packets the transmission of which has been delayed in method 1120. At 1186, the transmission of one or more messages or packets over one or more networks 40, 42, or 70 may be delayed for a time determined by a delay table, such as delay table 1140 illustrated in FIG. 11. At 1188, if additional messages are to be transmitted, the method 1180 may be repeated.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A network traffic management system that delays transmission of a message over a congested network, comprising:

a network communication device for communicating data to remote devices;
a real-time clock;
a data storage device containing a scheduled event defining a time for hardware to be actuated by a remote device on the network; and
a processor coupled to the network communication device, the data storage device, and the real-time clock, the processor including instructions which, when executed by the processor, cause the processor to:
receive a scheduled event message that will initiate hardware actuation to be broadcast over the network communication device from the data storage device;
determine how many broadcast messages, each broadcast message to be transmitted to a plurality of nodes in the network coupled to the network communication device, are currently being transmitted over the network;
wait a predefined delay time based on the number of broadcasts currently being transmitted over the network before transmitting the message to be broadcast; and
transmit the message to be broadcast through the network communication device to at least two other devices coupled to the network to actuate at least one hardware device as instructed by the message after passage of the predefined delay time, the delay time indicated by the real-time clock.

2. The network traffic management system of claim 1, wherein the message to be broadcast is received by the processor.

3. The network traffic management system of claim 1, wherein the message to be broadcast is created by the processor.

4. The network traffic management system of claim 1, wherein the message to be broadcast is read by the processor from a data storage device coupled to the processor.

5. The network traffic management system of claim 1, wherein the network communication system is a gateway.

6. The network traffic management system of claim 1, wherein the predetermined period of time is based on the number of items in a network transmission stack.

7. The network traffic management system of claim 1, wherein the predetermined period of time is based on the number of items in a network transmission queue.

8. The network traffic management system of claim 1, wherein the predetermined period of time is based on the number of items in a network transmission stack and a network transmission queue.

9. The network traffic management system of claim 1, wherein the message comprises at least one packet.

10. A network traffic management system that delays transmission of a message over a congested network, comprising:
a network communication device for communicating data to remote devices on a network;
a data storage device for storing a plurality of events to be communicated on the network by the network communication device;
a real-time clock; and
a processor coupled to the network communication device, the data storage device, and the real-time clock, the processor including instructions which, when executed by the processor, cause the processor to:
read at least one broadcast to be transmitted over the network communication device from the data storage device;
determine how many broadcast messages, each broadcast message to be transmitted to a plurality of nodes in the network coupled to the network communication device, are currently being transmitted over the network;
wait a predefined delay time based on the number of broadcasts to be currently transmitted over the network before transmitting the message to be broadcast; and
transmit the message to be broadcast over the network to at least two other devices coupled to the network after passage of the predefined delay time as indicated by the real-time clock.

11. The network traffic management system of claim 10, wherein the network traffic management system is a gateway.

12. The network traffic management system of claim 10, wherein the number of broadcasts to be transmitted includes a number of packets to be transmitted.

13. The network traffic management system of claim 10, wherein the number of broadcasts to be transmitted includes a number of broadcast transmissions being tracked in a broadcast table.

14. The network traffic management system of claim 10, wherein the number of broadcasts to be transmitted includes a number of broadcast transmissions that are currently in a queue.

15. The network traffic management system of claim 10, wherein the number of broadcasts to be transmitted includes both a number of broadcast transmissions being tracked in a broadcast table and a number of broadcast transmissions currently in a queue.

16. The network traffic management system of claim 10, wherein the broadcast is initiated by the processor reading from the data storage device.

17. The network traffic management system of claim 10, wherein the broadcast is a currently scheduled action the processor reads from the data storage device.

18. The network traffic management system of claim 10, wherein the broadcast is created by the processor.

19. A method of network traffic management that delays transmission of a message over a congested network, comprising:
receiving a message that will initiate hardware actuation and is to be broadcast over a network;
determining how many broadcast messages are currently being transmitted over the network, each broadcast message to be transmitted to a plurality of nodes on the network;
waiting a predefined delay time based on the number of broadcast messages currently being transmitted over the network; and
transmitting the message to be broadcast over the network to at least two devices that will actuate at least two hardware devices as instructed by the message after passage of the predefined delay time.

20. The method of network traffic management of claim 19, wherein the message is a packet.

21. A network traffic management system that delays transmission of a message over a congested network, comprising:
a network communication device for communicating data to remote devices;
a real-time clock; and a processor coupled to the network communication device and the real-time clock, the processor including instructions which, when executed by the processor, cause the processor to:
  have a scheduled event message that will initiate hardware actuation and is to be broadcast over the network communication device;
  determine how many broadcast messages, each broadcast message to be transmitted to a plurality of nodes in the network coupled to the network communication device, are currently being transmitted over the network;
  wait a predefined delay time based on the number of broadcasts currently being transmitted over the network before transmitting the message to be broadcast; and
transmit the message to be broadcast through the network communication device to at least two other devices coupled to the network to actuate at least one hardware device as instructed by the message after passage of the predefined delay time, the delay time indicated by the real-time clock.

* * * * *